United States Patent
Kurematsu et al.

(10) Patent No.: US 11,009,114 B2
(45) Date of Patent: May 18, 2021

(54) SPROCKET AND TRANSMISSION MECHANISM

(71) Applicant: TSUBAKIMOTO CHAIN CO., Osaka (JP)

(72) Inventors: Yuji Kurematsu, Osaka (JP); Tsuyoshi Kabai, Osaka (JP); Kazuyuki Ebinuma, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 285 days.

(21) Appl. No.: 16/175,360

(22) Filed: Oct. 30, 2018

(65) Prior Publication Data

US 2019/0136956 A1 May 9, 2019

(30) Foreign Application Priority Data

Nov. 6, 2017 (JP) .............................. JP2017-213434

(51) Int. Cl.
*F16H 55/30* (2006.01)

(52) U.S. Cl.
CPC ....... *F16H 55/30* (2013.01); *F16H 2055/306* (2013.01)

(58) Field of Classification Search
CPC ...... F16H 55/30; F16H 7/06; F16H 2035/003; F01L 1/022
USPC .................................................. 474/152, 156
See application file for complete search history.

(56) References Cited

U.S. PATENT DOCUMENTS

| 515,449 | A | * | 2/1894 | Scovell | .......................... 474/141 |
| 530,058 | A | * | 11/1894 | Schaum | .................... F16H 7/06 |
| | | | | | 474/112 |
| 596,289 | A | * | 12/1897 | Smith | .......................... 474/141 |
| 611,170 | A | * | 9/1898 | Howard | ................ F16H 7/1281 |
| | | | | | 474/134 |
| 613,756 | A | * | 11/1898 | Buddle | .......................... 474/141 |
| 2,941,413 | A | * | 6/1960 | Huber | ....................... F16G 5/20 |
| | | | | | 474/250 |
| 3,125,892 | A | * | 3/1964 | Schwesinger | ........... F16H 35/02 |
| | | | | | 74/393 |
| 3,583,250 | A | * | 6/1971 | Kongelka | ............... F16H 7/023 |
| | | | | | 474/133 |
| 3,585,874 | A | * | 6/1971 | Ingham | ................. F16H 55/084 |
| | | | | | 74/333 |

(Continued)

FOREIGN PATENT DOCUMENTS

| JP | 2003-184996 A | 7/2003 |
| JP | 2009-156320 A | 7/2009 |

(Continued)

*Primary Examiner* — Henry Y Liu
(74) *Attorney, Agent, or Firm* — Westerman, Hattori, Daniels & Adrian, LLP

(57) ABSTRACT

Provided is a sprocket which suppresses generation of order sounds corresponding to cycles and prevents increase in tension fluctuations, noise, and vibrations caused by resonance while alleviating the influence of the tension fluctuations corresponding to load torque fluctuations and suppressing noise and vibrations. A plurality of teeth formed to engage with a chain are arranged to form a phase fluctuation pattern of a waveform having a phase which fluctuates between positive and negative sides, and the phase fluctuation pattern is set to have parts having different wavelengths.

7 Claims, 2 Drawing Sheets

(56) References Cited

U.S. PATENT DOCUMENTS

| | | | | |
|---|---|---|---|---|
| 3,899,932 | A * | 8/1975 | Durham | F16H 55/30 474/141 |
| 4,181,034 | A * | 1/1980 | Daniel | B62M 9/08 474/141 |
| 4,522,610 | A * | 6/1985 | Nagano | B62M 3/003 280/261 |
| 4,810,237 | A * | 3/1989 | Mantovaara | F16H 9/12 474/166 |
| 4,865,577 | A * | 9/1989 | Freudenstein | B62M 9/08 474/141 |
| 5,492,390 | A * | 2/1996 | Kugelmann, Sr. | B60B 19/00 301/5.1 |
| 5,517,931 | A * | 5/1996 | Kawaguchi | F04B 9/02 111/118 |
| 5,611,744 | A * | 3/1997 | Shen | B62M 9/085 474/141 |
| 5,876,295 | A * | 3/1999 | Young | F16H 7/06 474/156 |
| 6,019,692 | A * | 2/2000 | Kojima | F16F 15/1442 474/87 |
| 6,050,916 | A * | 4/2000 | Hunkert | F01L 1/022 474/153 |
| 6,155,943 | A * | 12/2000 | Ledvina | F16H 7/06 160/152 |
| 6,213,905 | B1 * | 4/2001 | White | F16H 7/06 474/148 |
| 6,932,037 | B2 * | 8/2005 | Simpson | F01L 1/34409 123/90.17 |
| 7,044,875 | B2 * | 5/2006 | Gajewski | F01L 1/02 474/148 |
| 7,125,356 | B2 * | 10/2006 | Todd | F16H 55/30 474/152 |
| 7,493,880 | B2 * | 2/2009 | Gajewski | F01L 1/022 123/90.31 |
| 7,691,020 | B2 * | 4/2010 | Sakura | F16H 55/30 474/156 |
| 7,720,650 | B2 * | 5/2010 | Gajewski | F01L 1/02 703/1 |
| 7,857,720 | B2 * | 12/2010 | Lacy | F01L 1/024 474/141 |
| 7,901,312 | B2 * | 3/2011 | Ogo | F16H 55/08 474/212 |
| 8,062,158 | B2 * | 11/2011 | Nakano | F16H 55/30 474/141 |
| 8,342,993 | B2 * | 1/2013 | Gajewski | F01L 1/022 474/141 |
| 8,353,796 | B2 * | 1/2013 | Ritz | F16H 55/30 474/155 |
| 8,430,775 | B2 * | 4/2013 | Todd | F16H 7/06 474/148 |
| 2002/0142873 | A1 * | 10/2002 | Oser | B66D 3/18 474/141 |
| 2002/0169043 | A1 * | 11/2002 | Liu | B62M 9/08 474/141 |
| 2003/0087714 | A1 * | 5/2003 | Todd | F16H 55/30 474/156 |
| 2003/0104886 | A1 * | 6/2003 | Gajewski | F01L 1/022 474/87 |
| 2004/0144348 | A1 * | 7/2004 | Simpson | F01L 1/022 123/90.17 |
| 2005/0119079 | A1 * | 6/2005 | Okabe | F16G 13/06 474/155 |
| 2006/0240925 | A1 | 10/2006 | Todd | |
| 2007/0037649 | A1 * | 2/2007 | Pflug | F16H 7/02 474/141 |
| 2007/0066430 | A1 * | 3/2007 | Gajewski | F01L 1/022 474/141 |
| 2008/0085799 | A1 * | 4/2008 | Lacy | F01L 1/024 474/141 |
| 2008/0176689 | A1 * | 7/2008 | Rettig | F16H 55/084 474/141 |
| 2008/0200293 | A1 * | 8/2008 | Gajewski | F01L 1/024 474/141 |
| 2008/0287234 | A1 * | 11/2008 | Kern | F01L 1/02 474/133 |
| 2009/0149287 | A1 * | 6/2009 | Gajewski | F01L 1/022 474/141 |
| 2009/0170648 | A1 * | 7/2009 | Nakano | F16H 55/30 474/141 |
| 2009/0253542 | A1 * | 10/2009 | Kern | F16H 55/084 474/141 |
| 2010/0064848 | A1 * | 3/2010 | Komori | F16H 61/04 74/665 N |
| 2010/0137085 | A1 * | 6/2010 | Nakano | F16H 55/30 474/155 |
| 2010/0151978 | A1 | 6/2010 | Todd | |
| 2010/0160098 | A1 * | 6/2010 | Sonoda | F16H 55/30 474/101 |
| 2010/0160100 | A1 * | 6/2010 | Gajewski | F16H 35/02 474/141 |
| 2010/0292038 | A1 * | 11/2010 | Todd | F16H 7/06 474/148 |
| 2015/0068337 | A1 * | 3/2015 | Galeev | F02B 41/00 74/414 |

FOREIGN PATENT DOCUMENTS

| | | |
|---|---|---|
| KR | 10-2010-0071902 A | 6/2010 |
| KR | 10-2014-0114414 A | 9/2014 |

* cited by examiner

SPROCKET AND TRANSMISSION MECHANISM

BACKGROUND OF THE INVENTION

1. Field of the Invention

The present invention relates to a sprocket having a plurality of teeth formed to engage with a chain, and a transmission mechanism.

2. Description of the Related Art

A transmission mechanism including a sprocket having a plurality of teeth formed at a circumferential surface of a main body thereof and a chain passing over the sprocket is commonly used as a transmission mechanism for surely transmitting rotation.

As the teeth of the sprocket engage with the chain, the timing and rotation force may surely be transmitted among a plurality of sprockets, but noise and vibrations generated by the engagement cannot be avoided.

In a case of a transmission mechanism which has periodic load torque fluctuations with its rotation, in order to alleviate tension fluctuations by synchronizing the tension fluctuations with the periodic load torque fluctuations, a known sprocket is provided to form a phase fluctuation pattern in which the phase alternately fluctuates between positive and negative sides when the phase in which a plurality of teeth engage with a chain at equal intervals is zero, so that the influence of the tension fluctuations corresponding to the load torque fluctuations is alleviated and noise and vibrations are suppressed (see, for example, Japanese Patent Application Publication No. 2009-156320).

SUMMARY OF THE INVENTION

In the known sprocket, noise attributable to the vibrations of the chain can be suppressed by reducing the tension fluctuations, but since the load torque fluctuations are periodic, order sounds corresponding to the cycles are unavoidably generated.

In addition, when the phase in the load torque fluctuations shifts or resonance occurs due the relation between the rotation number of the sprocket and the natural frequency of the chain, the tension fluctuations may conversely increase or the noise and vibrations may increase.

The present invention concerns a solution to these problems, and an object of the present invention is to provide a sprocket that suppresses generation of order sounds corresponding to the load torque fluctuation cycles, prevents increase in tension fluctuations, noise, and vibrations caused for example by the phase shift in the load torque fluctuations and resonance while alleviating the tension fluctuations corresponding to the load torque fluctuations and suppressing the noise and vibrations.

In order to solve the problems, a sprocket according to the present invention has a plurality of teeth formed to engage with a chain, the plurality of teeth are arranged to form a phase fluctuation pattern of a waveform having the phase which fluctuates between positive and negative sides when the phase in which the teeth engage with the chain at equal intervals is zero, and the phase fluctuation pattern is set to have parts having different wavelengths.

The sprocket of claim 1 is provided to form a phase fluctuation pattern of a waveform having a phase which fluctuates between positive and negative sides, when the phase in which the teeth engage with the chain at equal intervals is zero, so that the influence of tension fluctuations corresponding to periodic load torque fluctuations can be alleviated and noise and vibrations can be suppressed.

Since the phase fluctuation pattern is set to have parts having different wavelengths, load torque fluctuation cycles and a plurality of phase fluctuation cycles partly shift, and generation of order sounds corresponding to the load torque fluctuation cycles can be suppressed, resonance can be suppressed, and increase in the tension fluctuations, noise, and vibrations attributable to the phase shift in the load torque fluctuations, the resonance, and the like can be prevented.

In the configuration of claim 2, a wavelength of the phase fluctuation pattern is set to continuously change from long to short or from short to long in a circumferential direction, and therefore the timing in which the phase shift occurs between the load torque fluctuation cycle and the phase fluctuation pattern cycle can be changed smoothly, so that generation of order sounds can further be suppressed.

In the configuration of claim 3, the phase fluctuation pattern includes a part which has a wavelength equal to a wavelength of a main torque fluctuation, so that the influence upon the torque fluctuations which may cause major noise or vibrations can effectively be alleviated.

In the configuration of claim 4, a wavelength of the phase fluctuation pattern is set to include a wavelength of equal to a half or twice of the wavelength of the main torque fluctuation, and therefore a plurality of order sounds corresponding to the cycle of the main torque fluctuation can be alleviated even more effectively.

In the configuration of claim 5, the phase fluctuation pattern has a plurality of cycles per rotation of the sprocket, and the plurality of teeth are arranged in a circumferential direction so that the number of teeth which forms a cycle having a maximum wavelength in the phase fluctuation pattern is smaller than the number of teeth over which the chain passes, so that a part with a large phase fluctuation and a part with a small phase fluctuation can inevitably be provided at the part over which the chain passes, so that the chain tension fluctuations can be reduced.

In the configuration of claim 6, the plurality of teeth are arranged in a circumferential direction so that an angular range having a maximum wavelength in the phase fluctuation pattern includes a range at least twice as large as an angular range having a minimum wavelength and so that the wavelength continuously changes, and therefore the chain tension fluctuations can further be reduced.

In the configuration of claim 7, the phase fluctuation pattern includes patterns among which maximum fluctuation phases have different levels (wave-heights), and therefore the phase shift amount can be changed, so that generation of order sounds can further be suppressed.

DESCRIPTION OF THE PREFERRED EMBODIMENTS

A sprocket according to the present invention has a plurality of teeth formed to engage with a chain, the plurality of teeth are arranged to form a phase fluctuation pattern of a waveform having a phase which fluctuates between positive and negative sides when the phase in which the teeth engage with the chain at equal intervals is zero, the phase fluctuation pattern is set to have parts having different wavelengths, so that generation of order sounds corresponding to cycles is suppressed, and increase in tension fluctuations, noise, and vibrations attributable to the phase shift in the load torque fluctuations, resonance, or the like can be prevented while the influence of tension fluctuations corresponding to load torque fluctuations is alleviated and noise or vibrations are suppressed. The sprocket may have any specific configuration if the above is fulfilled.

The chain which passes over the sprocket may be any of a silent chain, a roller chain, and a bush chain or a flexible transmission member such as a timing belt if the member may engage with the teeth of the sprocket.

The tooth pitch is preferably varied as a specific method for forming a phase fluctuation pattern while a phase fluctuation pattern may be formed for example by changing the shape of the teeth engagement surface or the engagement position between the teeth and the chain in the radial direction.

The waveform of the phase fluctuation pattern may have one cycle or a plurality of cycles around the entire sprocket.

Note that the term "cycle" herein refers to one "cycle" corresponding to a set of a fluctuation to the positive (crest) side and a fluctuation to the negative (trough) side in the waveform of the phase fluctuation pattern and represents the idea of a waveform having a varying wavelength within one "cycle."

An exemplary sprocket according to the present invention having 40 teeth for use in a camshaft in an inline four-cylinder four-cycle DOHC engine will be described.

Figure 1:
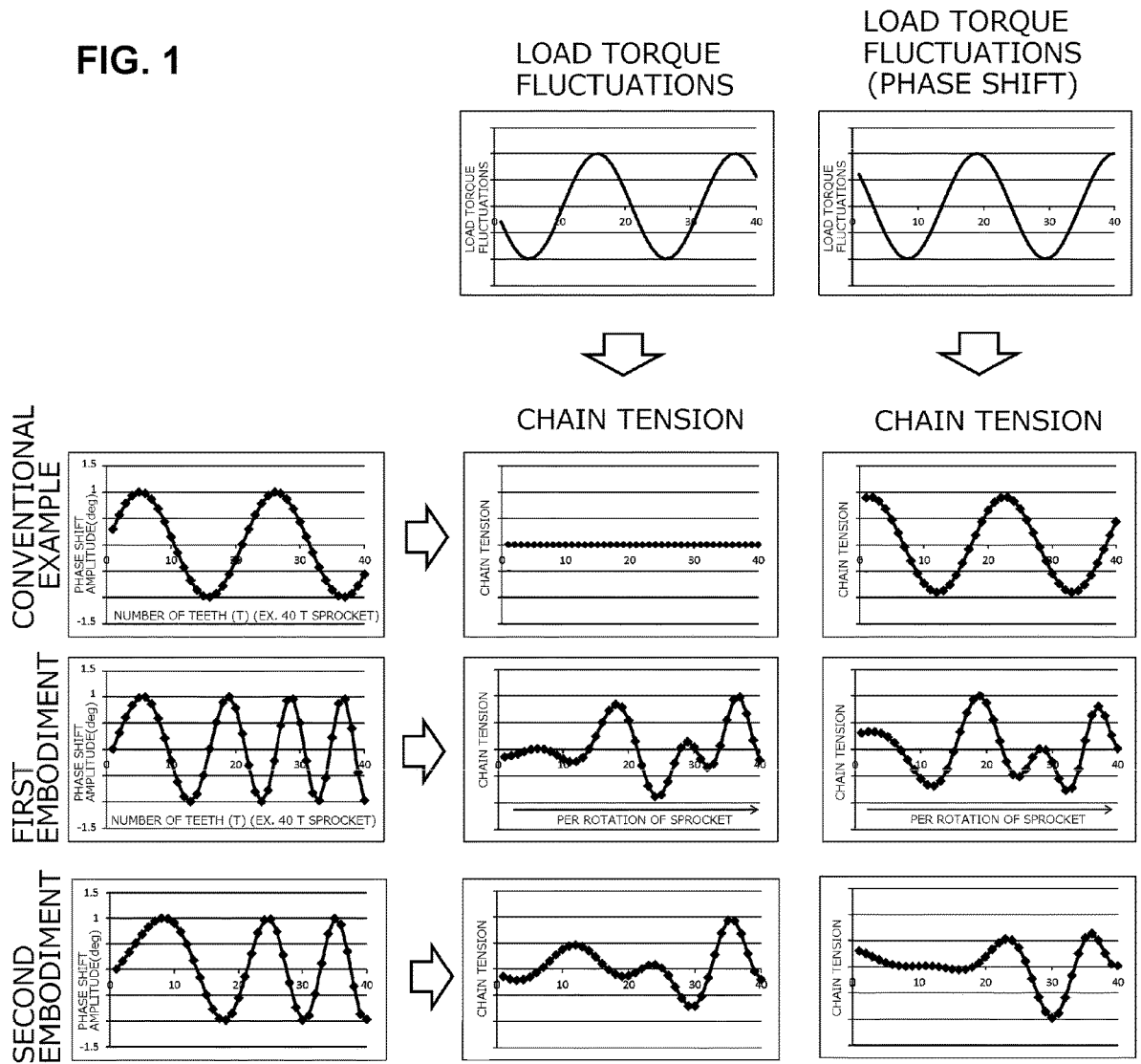
FIG. 1 shows graphs representing phase fluctuation patterns and tension fluctuations by sprockets according to first and second embodiments of the present invention.

As shown in FIG. 1, the camshaft in the inline four-cylinder four-cycle DOHC engine has two load torque fluctuations per revolution.

When a variable valve timing mechanism is provided, the phase in the load torque fluctuations changes as shown in FIG. 1.

First, the conventional sprocket disclosed in Japanese Patent Application Publication No. 2009-156320 has a phase fluctuation pattern having two cycles synchronized so as to cancel the load torque fluctuations as shown in the conventional example in FIG. 1.

In the state, the chain tension is uniform in an ideal state as shown in FIG. 1, but the tension is not uniform in practice for example due to temperature changes and chain elongation, and two periodic chain tension fluctuations occur.

When the phase in the load torque fluctuations shifts, two periodic chain tension fluctuations occur as shown in FIG. 1.

In contrast, as shown in FIG. 1 showing a first embodiment of the present invention, a sprocket according to the first embodiment has a phase fluctuation pattern having a waveform of four cycles which is twice the load torque fluctuations, and the wavelength is set to continuously change from long to short in each cycle and among the cycles in the circumferential direction.

As a result, the chain tension fluctuates but the fluctuations have smaller wavelengths than the lead torque fluctuations and become random, and even when the phase in the load torque fluctuations shifts, the chain tension has smaller wavelengths than the load torque fluctuations, and are kept random.

This can alleviate the influence of the tension fluctuations corresponding to the load torque fluctuations, suppress generation of order sounds corresponding to cycles while suppressing noise and vibrations, so that increase in the tension fluctuations, the noise, and the vibrations which are for example attributable to the phase shift in the load torque fluctuations and resonance can be prevented.

A sprocket according to a second embodiment of the present invention has a phase fluctuation pattern having a waveform of three cycles, and the wavelength of the phase fluctuation pattern is set to continuously change from long to short in each cycle and among the cycles in the circumferential direction, and the maximum wave length is set to match the wavelength of the load torque fluctuations and to be twice of the minimum wavelength.

As a result, the chain tension fluctuations have even smaller wavelengths than those of the load torque fluctuations and the wavelength is particularly small when the phase in these load torque fluctuations shifts.

Figure 2:
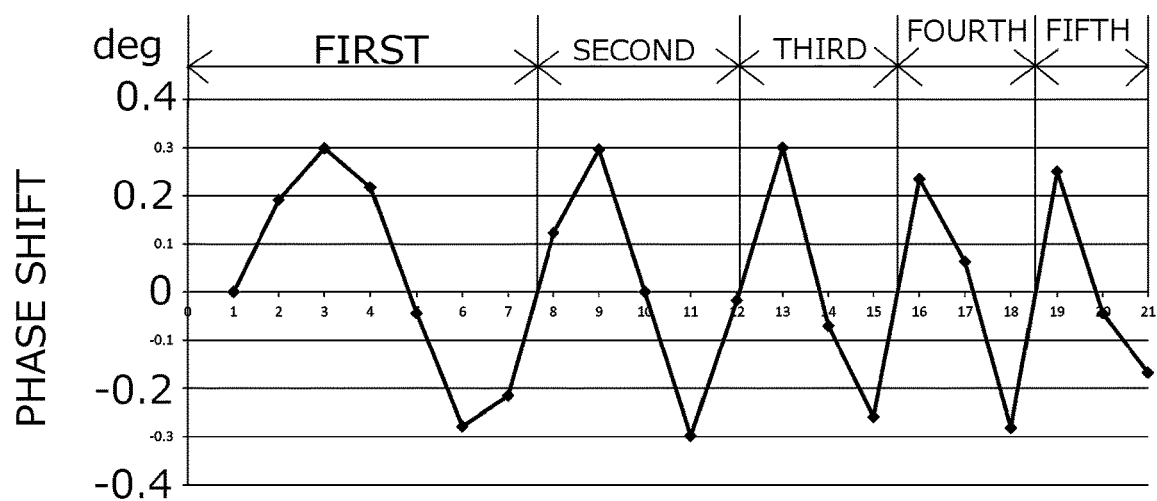
FIG. 2 is a graph representing a phase fluctuation pattern by a sprocket according to a third embodiment of the present invention.

As shown in FIG. 2, a sprocket according to a third embodiment of the present invention has 21 teeth, the phase fluctuation pattern has five cycles, and the wavelength of the phase fluctuation pattern is set to continuously change from long to short from the first to fifth cycles in the circumferential direction.

The maximum fluctuation phase (wave-height) in the positive direction is set to be 0.3° from the first cycle to the third cycle and smaller in the fourth and fifth cycles, while the maximum fluctuation phase in the negative direction is set to be 0.3° in the second cycle and smaller in the first cycle and the third cycle to the fifth cycle.

While the above described embodiments are related to specific examples of the phase fluctuation patterns of the sprockets according to the invention, the described embodiments are not intended to limit the sprockets according to the invention, and the invention is susceptible to various modifications.

The invention claimed is:

1. A sprocket having a plurality of teeth formed to engage with a chain,
   the plurality of teeth being arranged to form a phase fluctuation pattern of a waveform having a phase which fluctuates between positive and negative sides when a phase in which the teeth engage with the chain at equal intervals is zero,
   the phase fluctuation pattern being set to have parts having different wavelengths,
   wherein a wavelength of the phase fluctuation pattern is set to continuously change from long to short or from short to long in a circumferential direction.

2. The sprocket according to claim 1, wherein the phase fluctuation pattern includes a part which has a wavelength equal to a wavelength of a main torque fluctuation.

3. The sprocket according to claim 2, wherein a wavelength of the phase fluctuation pattern is set to include a wavelength of equal to a half or twice of the wavelength of the main torque fluctuation.

4. The sprocket according to claim 1, wherein the phase fluctuation pattern has a plurality of cycles per rotation of the sprocket, and
   the plurality of teeth are arranged in a circumferential direction so that the number of teeth which forms a cycle having a maximum wavelength in the phase fluctuation pattern is smaller than the number of teeth over which the chain passes.

5. The sprocket according to claim 1, wherein the plurality of teeth are arranged in a circumferential direction so that an angular range having a maximum wavelength in the phase fluctuation pattern includes a range at least twice as large as an angular range having a minimum wavelength and so that the wavelength continuously changes.

6. The sprocket according to claim 1, wherein the phase fluctuation pattern includes patterns among which maximum fluctuation phases have different levels or wave-heights.

7. A transmission mechanism comprising:
the sprocket according to claim 1;
a shaft to which the sprocket is attached; and
a chain which passes over the sprocket.

* * * * *